US010272750B2

(12) United States Patent
Costa et al.

(10) Patent No.: US 10,272,750 B2
(45) Date of Patent: Apr. 30, 2019

(54) HATCHBACK DOOR FOR MOTOR VEHICLES

(71) Applicant: C.R.F. Societa Consortile per Azioni, Orbassano (Turin) (IT)

(72) Inventors: Nadia Costa, Orbassano (IT); Fabrizio Tribolo, Turin (IT); Claudio Cantarale, Turin (IT); Antonio Moda, Turin (IT); Francesco Chiaffoni, Orbassano (IT); Giuseppe Crisafi, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 131 days.

(21) Appl. No.: 15/618,220

(22) Filed: Jun. 9, 2017

(65) Prior Publication Data

US 2017/0361689 A1 Dec. 21, 2017

(30) Foreign Application Priority Data

Jun. 16, 2016 (EP) ..................................... 16174776

(51) Int. Cl.
*B60J 5/10* (2006.01)
*B60J 1/18* (2006.01)
(Continued)

(52) U.S. Cl.
CPC ................ *B60J 5/107* (2013.01); *B60J 1/18* (2013.01); *B60J 5/101* (2013.01); *B60Q 1/0041* (2013.01);
(Continued)

(58) Field of Classification Search
CPC ..... B60J 5/107; B60J 5/101; B60J 1/18; B60J 5/0481; B60S 1/043; B60S 1/52;
(Continued)

(56) References Cited

U.S. PATENT DOCUMENTS 4,799,730 A * 1/1989 Harasaki ................ B60H 1/248
296/203.04
6,068,327 A 5/2000 Junginger
(Continued)

FOREIGN PATENT DOCUMENTS

| EP | 0256399 A1 | 2/1988 |
| EP | 2384917 A1 | 11/2011 |
| WO | 2012013811 A1 | 2/2012 |

OTHER PUBLICATIONS

European Search Report dated Dec. 22, 2016, for European Patent Application No. 16174776.1, 3 pages.

*Primary Examiner* — Jason S Morrow
*Assistant Examiner* — E Turner Hicks
(74) *Attorney, Agent, or Firm* — RMCK Law Group PLC

(57) ABSTRACT

A hatchback door includes a load-bearing inner panel made of composite plastic material, a plastic top outer panel glued on a top portion of the inner panel, and a plastic bottom outer panel glued on a bottom portion of the inner panel. The top panel includes a first layer of transparent plastic material and a second layer of opaque plastic material or opaque paint. The opaque layer covers only some of the transparent layer such that the top panel is transparent in a central part overlying a rear-window opening of the inner panel and in its peripheral portions that function as transparent elements for two lateral sets of lights and a third top set of lights. The light sets are without a front transparent element and are connected to a rear side of the top panel. The transparent peripheral portions constitute the front transparent elements of the light sets.

14 Claims, 13 Drawing Sheets

(51) Int. Cl.
*B60Q 1/00* (2006.01)
*B60Q 1/30* (2006.01)
*B60S 1/04* (2006.01)
*B60S 1/52* (2006.01)
*B62D 35/00* (2006.01)
*F21V 3/00* (2015.01)
*F21Y 113/10* (2016.01)
*B60J 5/04* (2006.01)

(52) U.S. Cl.
CPC ............. *B60Q 1/30* (2013.01); *B60S 1/043* (2013.01); *B60S 1/52* (2013.01); *B62D 35/007* (2013.01); *F21V 3/00* (2013.01); *B60J 5/0481* (2013.01); *F21Y 2113/10* (2016.08)

(58) Field of Classification Search
CPC .......... B60Q 1/30; B60Q 1/0041; F21V 3/00; B62D 35/007; F21Y 2113/10
USPC ............................. 296/146.3, 146.8, 106, 56
See application file for complete search history.

(56) References Cited

U.S. PATENT DOCUMENTS

| | | | |
|---|---|---|---|
| 6,350,049 B1* | 2/2002 | Zimmermann | B60Q 1/30 34/506 |
| 6,505,882 B1* | 1/2003 | Morbach | B60J 5/12 296/146.11 |
| 6,763,778 B2* | 7/2004 | Bergquist | B60Q 1/302 116/28 R |
| 7,273,304 B2 | 9/2007 | Bischoff et al. | |
| 2002/0046517 A1* | 4/2002 | Kondo | B29C 45/16 52/204.591 |
| 2004/0160782 A1* | 8/2004 | Zimmermann | B60Q 1/2665 362/488 |
| 2006/0017304 A1 | 1/2006 | Bischoff et al. | |
| 2010/0019479 A1* | 1/2010 | Haynes | B60J 11/06 280/770 |
| 2011/0241376 A1 | 10/2011 | Igura | |
| 2013/0182450 A1 | 7/2013 | Buisson | |
| 2013/0280452 A1 | 10/2013 | Nawroth et al. | |

* cited by examiner

HATCHBACK DOOR FOR MOTOR VEHICLES

CROSS REFERENCE TO RELATED APPLICATIONS

This application claims priority to European Patent Application No. 16174776.1 filed on Jun. 16, 2016, the entire disclosure of which is incorporated herein by reference.

FIELD OF THE INVENTION

The present invention relates to the parts of motor-vehicle bodywork and in particular regards a hatchback door for motor vehicles constituted by components made of plastic material.

PRIOR ART

Motor-vehicle hatchback doors are already known that comprise a panel made of plastic material including at least one transparent portion (see, for example, the documents US 20130280452 A1, U.S. Pat. No. 7,273,304 B2 and EP 2384917 A1). Hatchback doors of this type present the advantage of being lighter than conventional hatchback doors that have a load-bearing structure made of sheet metal and a rear window made of glass.

The greatest difficulty in producing a hatchback door made of plastic material, without hence resorting to the use, in considerable amounts, of sheet metal and glass, is that of guaranteeing the necessary characteristics of strength and stiffness for the hatchback door and, at the same time, of creating a structure that is suited to mass production and that can be obtained with simple and low-cost operations.

The above aims have not so far been achieved in a satisfactory way, in particular in the case of complex shapes of hatchback door, which render the process of assembly laborious and costly.

OBJECT OF THE INVENTION

The object underlying the present invention is to produce a hatchback door for motor vehicles of the type referred to at the start of the present description that will overcome the aforesaid drawbacks of the prior art.

SUMMARY OF THE INVENTION

With a view to achieving the aforesaid object, the subject of the invention is a hatchback door for motor vehicles, comprising:
- a load-bearing inner panel made of composite plastic material, which defines a rear-window opening and has a plurality of metal inserts for connection of functional elements, such as, for example, a lock, at least one gas-operated spring and/or an electric actuator, and a pair of hinges for articulation of the hatchback door to the structure of the motor vehicle
- a top outer panel made of plastic material designed to be glued on the top portion of said load-bearing inner panel, wherein said top outer panel comprises a first layer of transparent plastic material and a second layer of opaque plastic material or of opaque paint, wherein said opaque plastic layer or layer of opaque paint covers only some parts of said transparent layer in such a way that said top outer panel is transparent in a central part thereof overlying said rear-window opening of said load-bearing inner panel, and
- a bottom outer panel made of plastic material glued on the bottom portion of said load-bearing inner panel and having a top portion that is also glued to a bottom portion of said top outer panel in such a way that the top portion of said bottom outer panel is set between said top outer panel and said load-bearing inner panel, said hatchback door being characterized in that
said top outer panel is transparent also in its peripheral portions that are to function as transparent elements for two lateral sets of lights and for a third top set of lights,
said lateral sets of lights and said top set of lights each having a load-bearing body with at least one light source and without a transparent outer front element,
the body of each set of lights being connected to a rear side of said top outer panel by a plurality of fixing elements mounted in and/or obtained from the inner surface of the top outer panel, in such a way that said transparent peripheral portions of the top outer panel constitute the front transparent elements of said sets of lights.

Thanks to the above characteristics, the hatchback door according to the present invention has a light structure, but at the same time sufficiently strong and stiff to withstand the loads to which it is subjected.

As referred to above, the hatchback door is obtained by means of gluing of three separate elements: the load-bearing inner panel, the top outer panel, and the bottom outer panel. This enables even complex shapes of hatchback door to be obtained (useful for characterizing the style of the motor vehicle), with an assembly process that is economically advantageous.

The hatchback door according to the present invention is moreover characterized in that the top outer panel has a hole for passage of a pin of the rear windscreen-wiper body, and in that the inner surface of the top outer panel has a projecting annular edge, which surrounds the aforesaid hole in such a way as to prevent, during painting of the inner surface, the paint from possibly dripping through the hole and reaching the outer surface of the top portion, giving rise to surface defects.

According to one embodiment of the present invention, the bottom outer panel is made of transparent or partially transparent plastic material, fixed and on the load-bearing inner panel is a light source in such a way as to light up a portion of the bottom outer panel for display of a logo, or the like.

In an alternative embodiment, the bottom outer panel is made of non-transparent and/or transparent painted plastic material.

Once again in an alternative embodiment of the present invention, in order to light up a portion of bottom outer panel for displaying a logo or the like, the bottom outer panel is made in an altogether similar way to the top outer panel, i.e., by providing a first layer of transparent plastic material and a second layer of opaque plastic material or of opaque paint, where said opaque layer or opaque paint covers only some parts of the transparent layer.

A further subject of the invention is a process for assembling the hatchback door of the present invention according to the steps specified in the annexed Claim 14.

DETAILED DESCRIPTION OF A PREFERRED EMBODIMENT

Further characteristics and advantages of the invention will emerge from the ensuing description, with reference to the annexed drawings, which are provided purely by way of non-limiting example and in which.

In the annexed drawings, the reference P designates as a whole a preferred embodiment of a motor-vehicle hatchback door according to the present invention.

Figure 1:
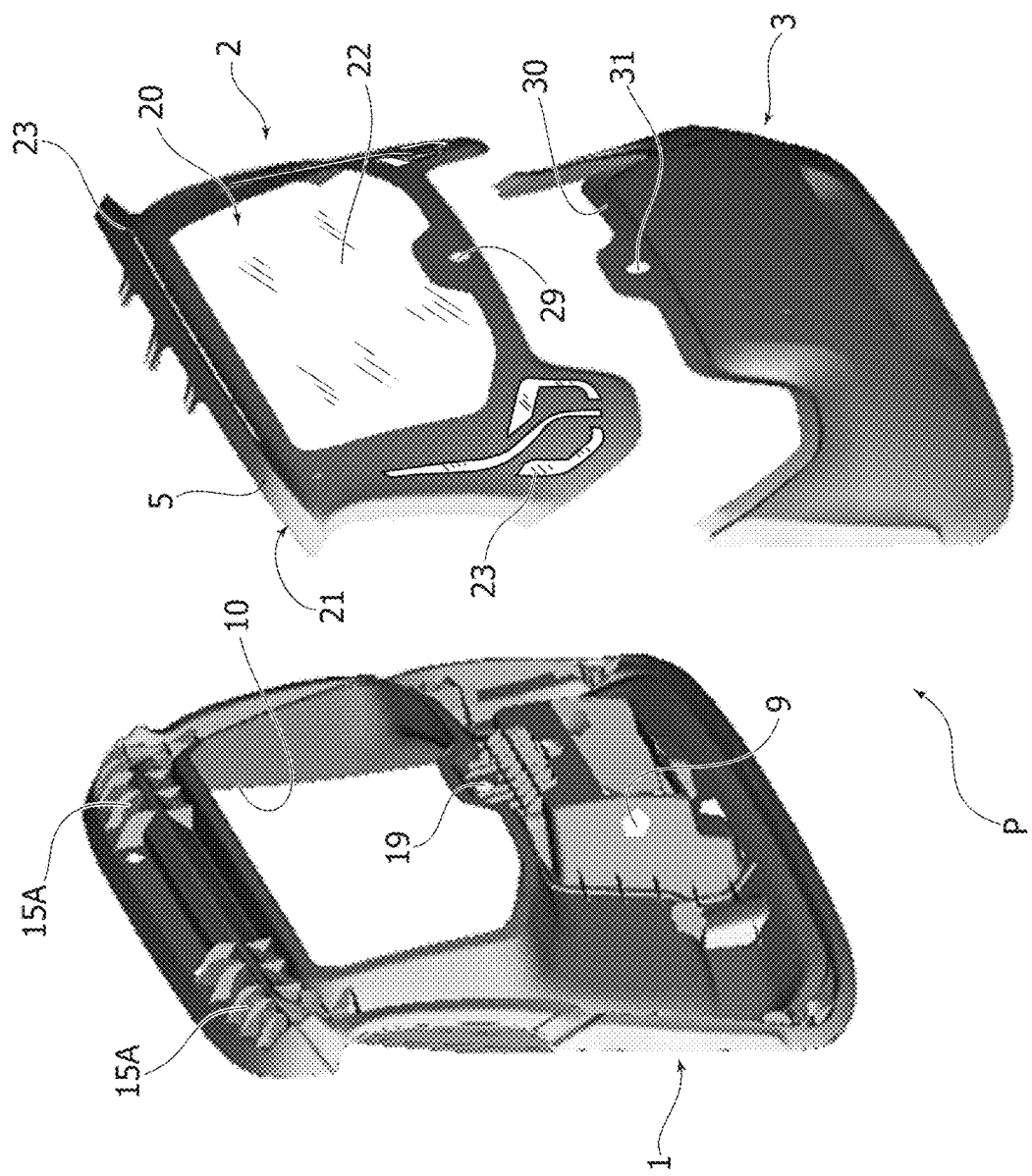
FIG. 1 is an exploded view of the main components of the hatchback door according to the present invention.

In particular, with reference to the exploded view of FIG. 1, the hatchback door P comprises a load-bearing inner panel 1 made of composite plastic material and defining a rear-window opening 10, a top outer panel 2 made of plastic material designed to be glued on the top portion of the load-bearing inner panel 1, and a bottom outer panel 3, which is also made of plastic material and is designed to be glued on the bottom portion of the load-bearing inner panel 1.

Figure 9:
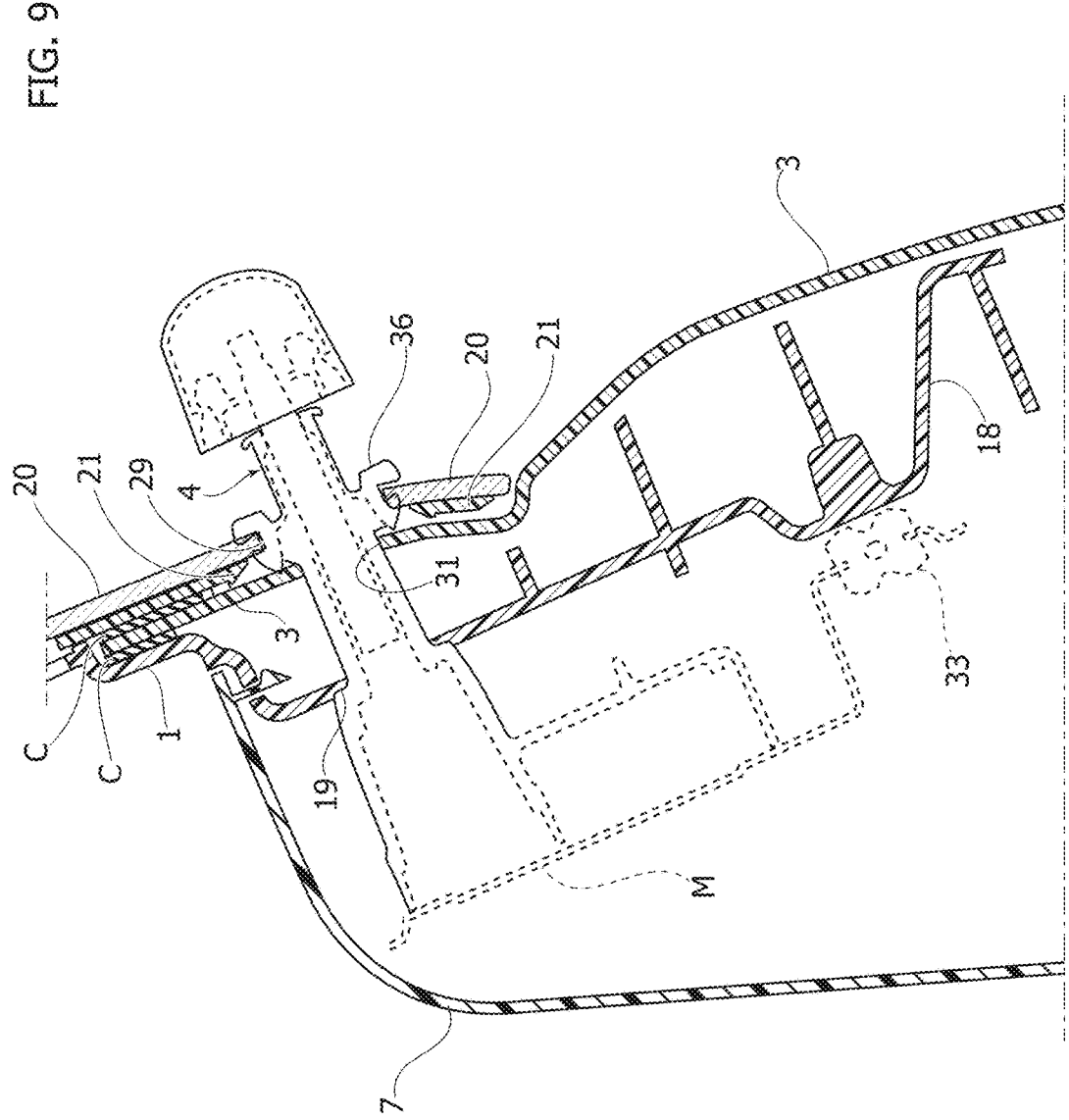
FIGS. 9-11 are views at an enlarged scale of some details illustrated in FIG. 8.
Figure 10:
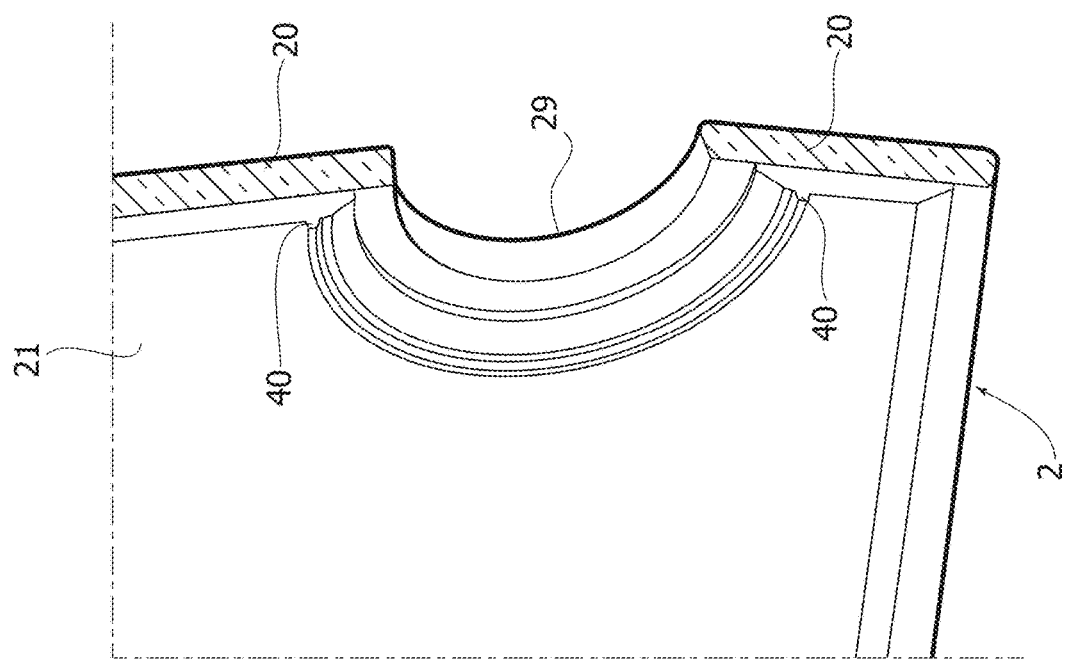
Figure 11:
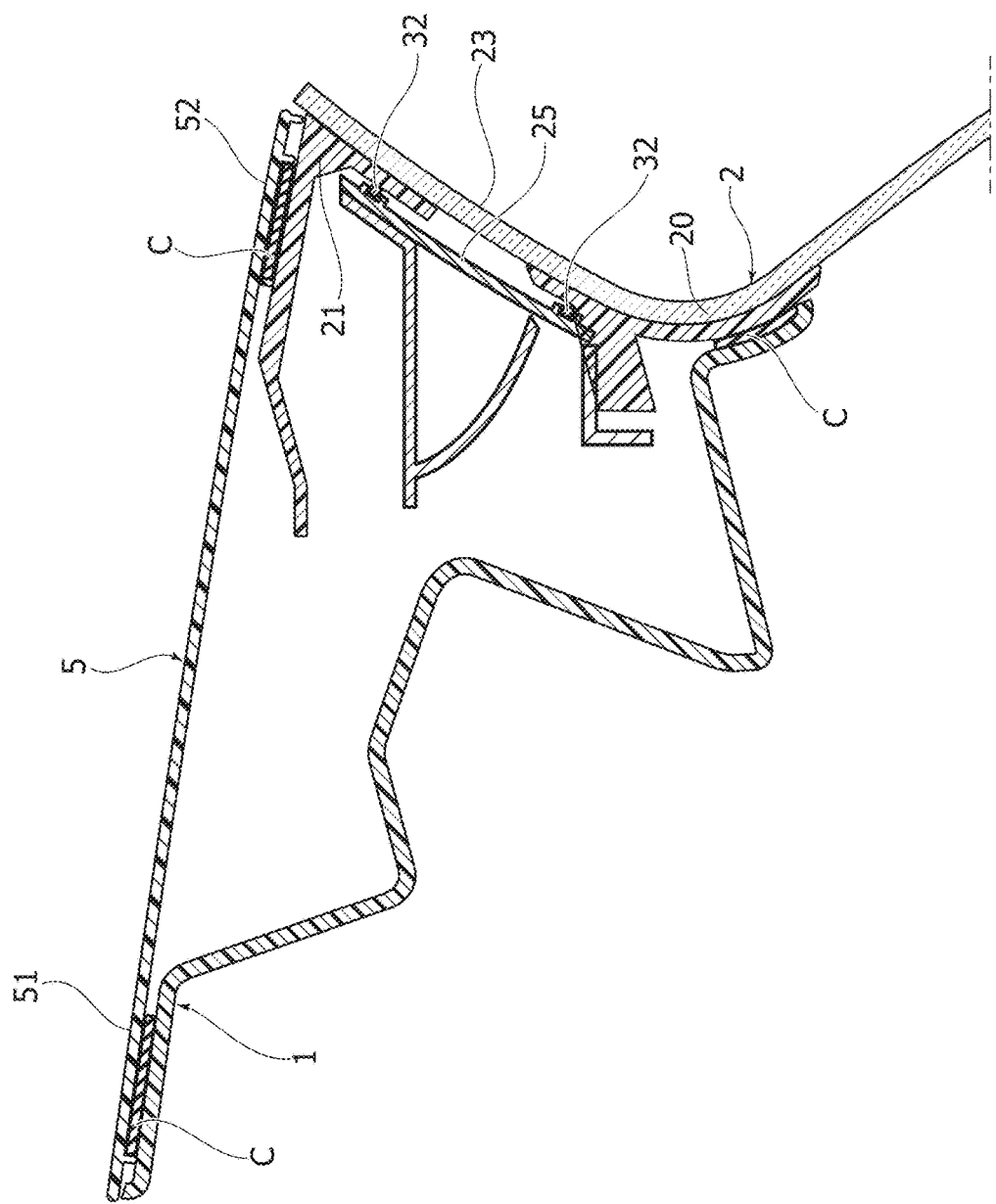

With reference in particular to FIG. 1 and to FIGS. 9-11, the top outer panel 2 comprises an outer layer of transparent plastic material 20, which substantially covers the entire extension of the panel, and an inner layer 21 made of opaque plastic material, moulded jointly with the layer 20, which instead covers only some parts of the transparent layer 20. More precisely, the opaque inner layer 21 does not cover a central part 22 of the panel 2, designed to overly the rear-window opening 10 of the load-bearing inner panel 1. The layer 21 does not cover even peripheral portions 23 of the panel 2 that are to function as transparent elements for two lateral sets of lights 24 and for a third top set of lights 25 (visible in FIG. 7). In an alternative embodiment, the inner opaque layer 21 is a layer of opaque paint that has the same function as the layer of opaque plastic material 21.

Consequently, the hatchback door P is mainly formed by components made of plastic material and does not have either portions made of sheet metal (except for some metal inserts described hereinafter) or a rear window made of glass.

According to one embodiment of the present invention, the load-bearing inner panel 1 is made of composite plastic material, for example polypropylene with glass fibres, the bottom outer panel 3 is made of polycarbonate or polypropylene, whereas the top panel 2 has the layer of transparent plastic material 20 that is made of polycarbonate and the layer of plastic material 21 that is made up of a mixture of polycarbonate and/or acrylonitrile-butadiene-styrene (ABS).

According to an important characteristic of the invention, the load-bearing inner panel 1 is obtained with a single moulding operation, and its body of plastic material has a plurality of metal inserts integrated within it. The metal inserts function as elements for connection and reinforcement for some functional elements of the hatchback door P (such as a lock of the hatchback door, at least one gas-operated spring and/or an electric actuator, a pair of hinges for articulation of the hatchback door to the structure of the motor vehicle, etc.). The details regarding the metal inserts of the hatchback door P will be described in the sequel of the present description.

As mentioned previously, the load-bearing inner panel 1, the top outer panel 2, and the bottom outer panel 3 are designed to be glued together so as to obtain the hatchback door P of the present invention. Thanks to the fact that the hatchback door P of a complex shape is obtained by gluing three separate elements, without hence resorting to a single operation of moulding of the hatchback door, it is possible to optimise mass production of the hatchback door P also from the standpoint of costs and even in the case of complex shapes.

Thanks to its structure, basically made up only of components made of plastic material, the hatchback door according to the present invention presents excellent characteristics of lightness. At the same time, the necessary characteristics of strength and torsional stiffness are ensured by the load-bearing inner panel 1.

Moreover, thanks to the fact that the hatchback door P is obtained by gluing separate elements (the load-bearing inner panel 1, the top outer panel 2, and the bottom outer panel 3), it is less problematical to obtain complex shapes of the hatchback door as compared to hatchback doors made of plastic obtained with a single moulding operation.

Further details of the sequence of gluing of the various components of the hatchback door P will be illustrated in the sequel of the present description.

Figure 2:
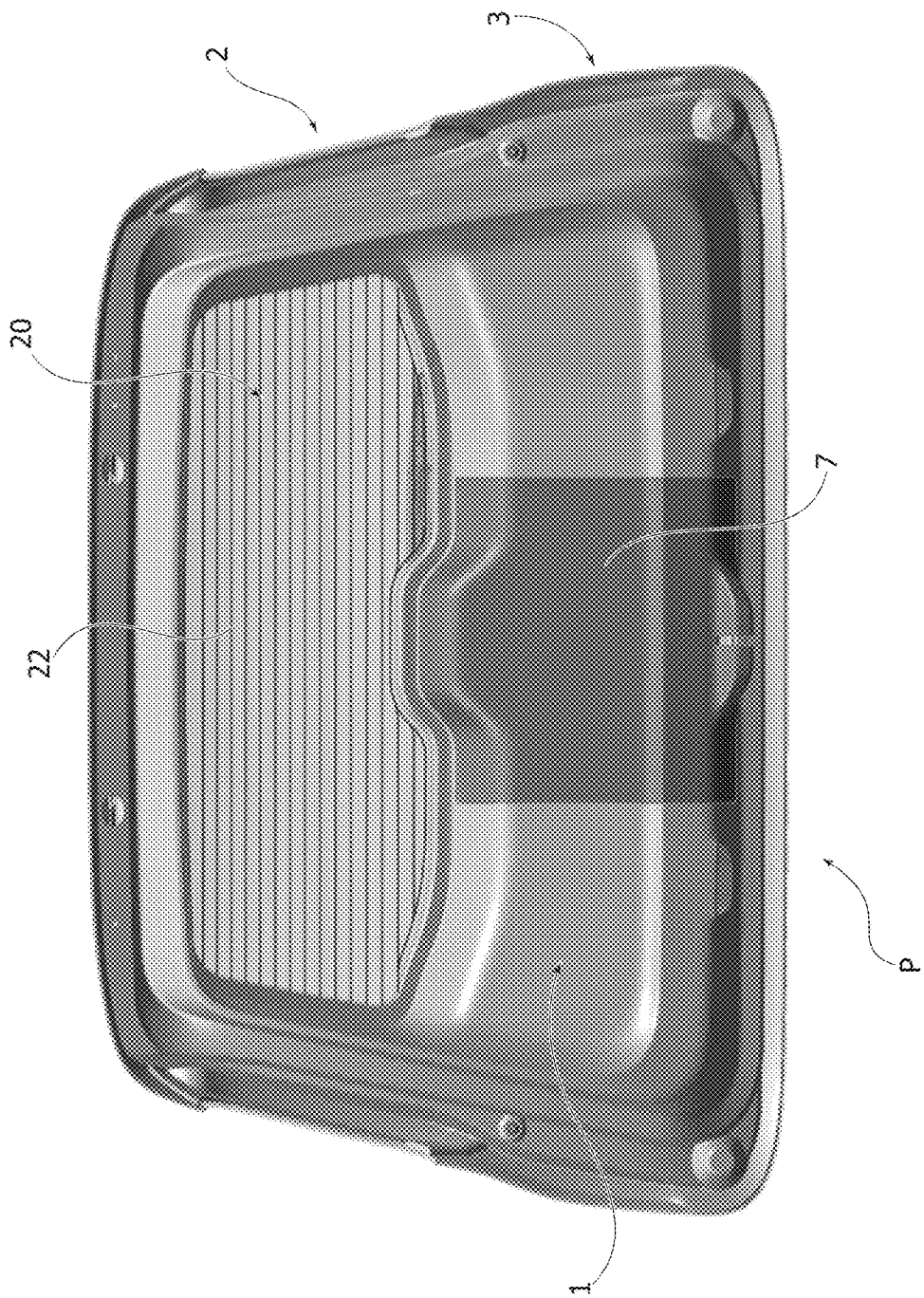
FIG. 2 is a front view from the inner side of the hatchback door according to the present invention.
Figure 3:
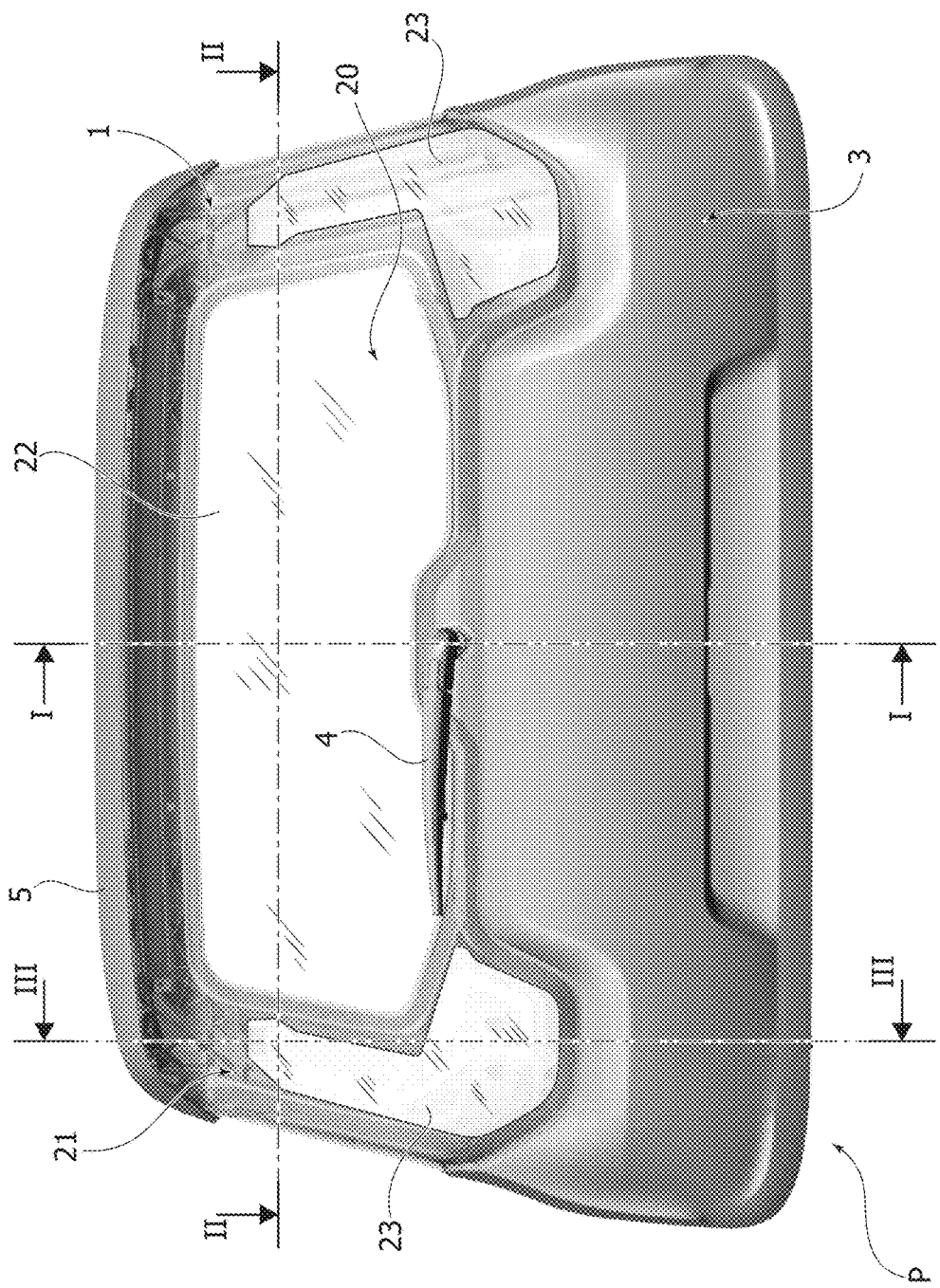
FIG. 3 is a front view from the outer side of the hatchback door illustrated in FIGS. 1 and 2.

FIGS. 2 and 3 represent the hatchback door P according to the present invention in an assembled condition and in a front view from its inner side and from its outer side, respectively. On the inner side, the load-bearing inner panel 1 has in its central portion a removable hatch 7, which, if it is removed, enables easy access, through an opening 35 (visible in FIG. 5), to accessory elements of the hatchback door P, specifically a rear windscreen-wiper assembly 4 and a lock 12 (for example, for replacement or maintenance operations). In an alternative embodiment (not illustrated in the drawings), further removable hatches are provided for gaining access to the sets of lights 24, 25.

As has been said previously, the top outer panel 2 is glued on the top portion of the load-bearing inner panel 1 and comprises a first layer of transparent plastic material 20 and a second layer of opaque plastic material 21 or opaque paint, where the layer 21 covers only some parts of the transparent layer 20 in such a way that the top outer panel 2 is transparent in its central part 22 overlying the rear-window opening 10 of the load-bearing inner panel 1 and in peripheral portions 23 that are to function as transparent elements for two lateral sets of lights and for a third top set of lights. Thanks to this characteristic, the function of rear window typically performed in a conventional hatchback door by a glass plate is here performed by the first layer of transparent plastic material 20 of the top outer panel 2. Likewise, the transparent material 20 in its peripheral portions 23 functions as lens of the sets of lights 24, 25 (illustrated in FIGS. 4 and 7), hence preventing the need to use elements dedicated to this function that are made of glass or plastic.

Figure 4:
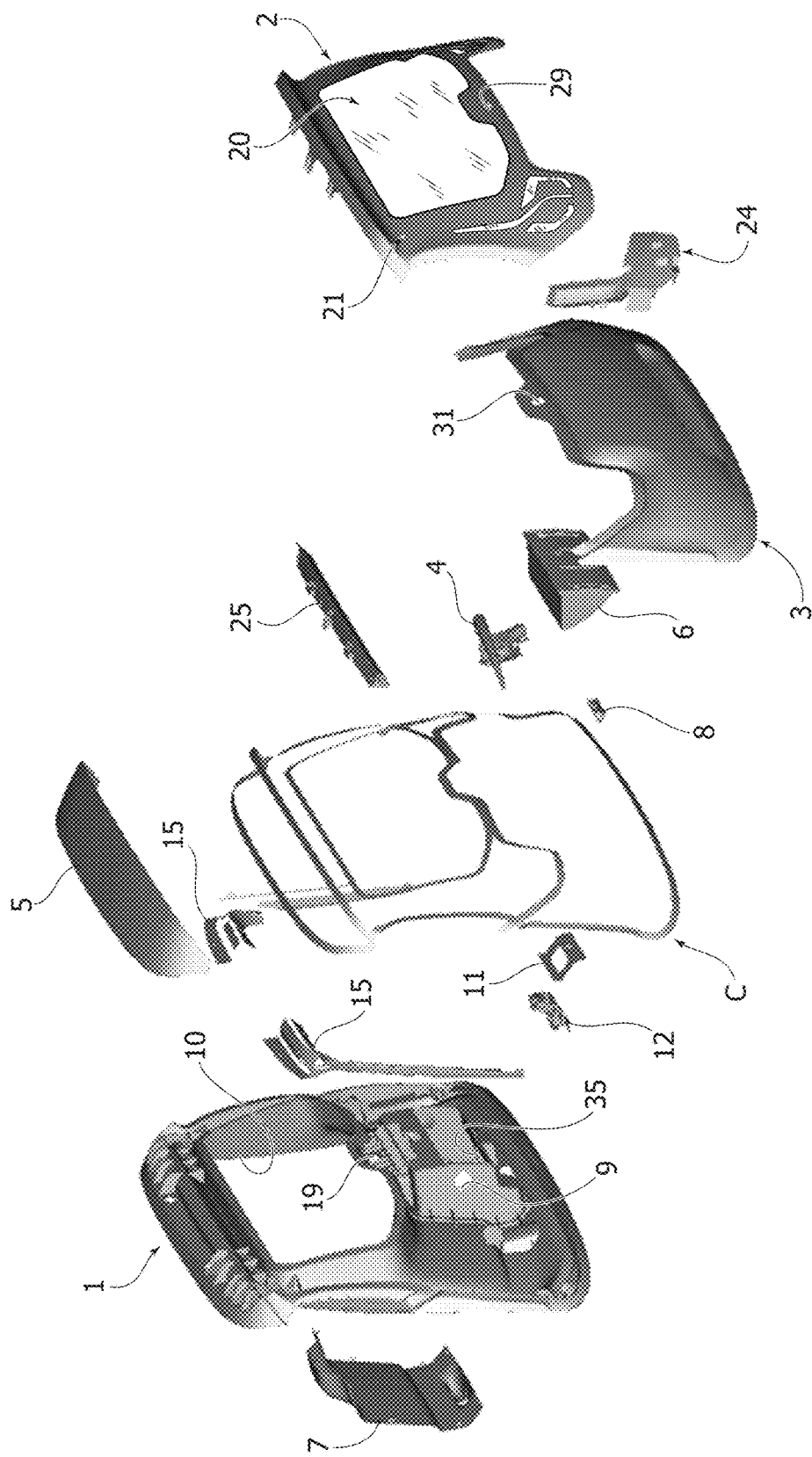
FIG. 4 is an exploded view in greater detail of the hatchback door illustrated in the previous figures.
Figure 5:
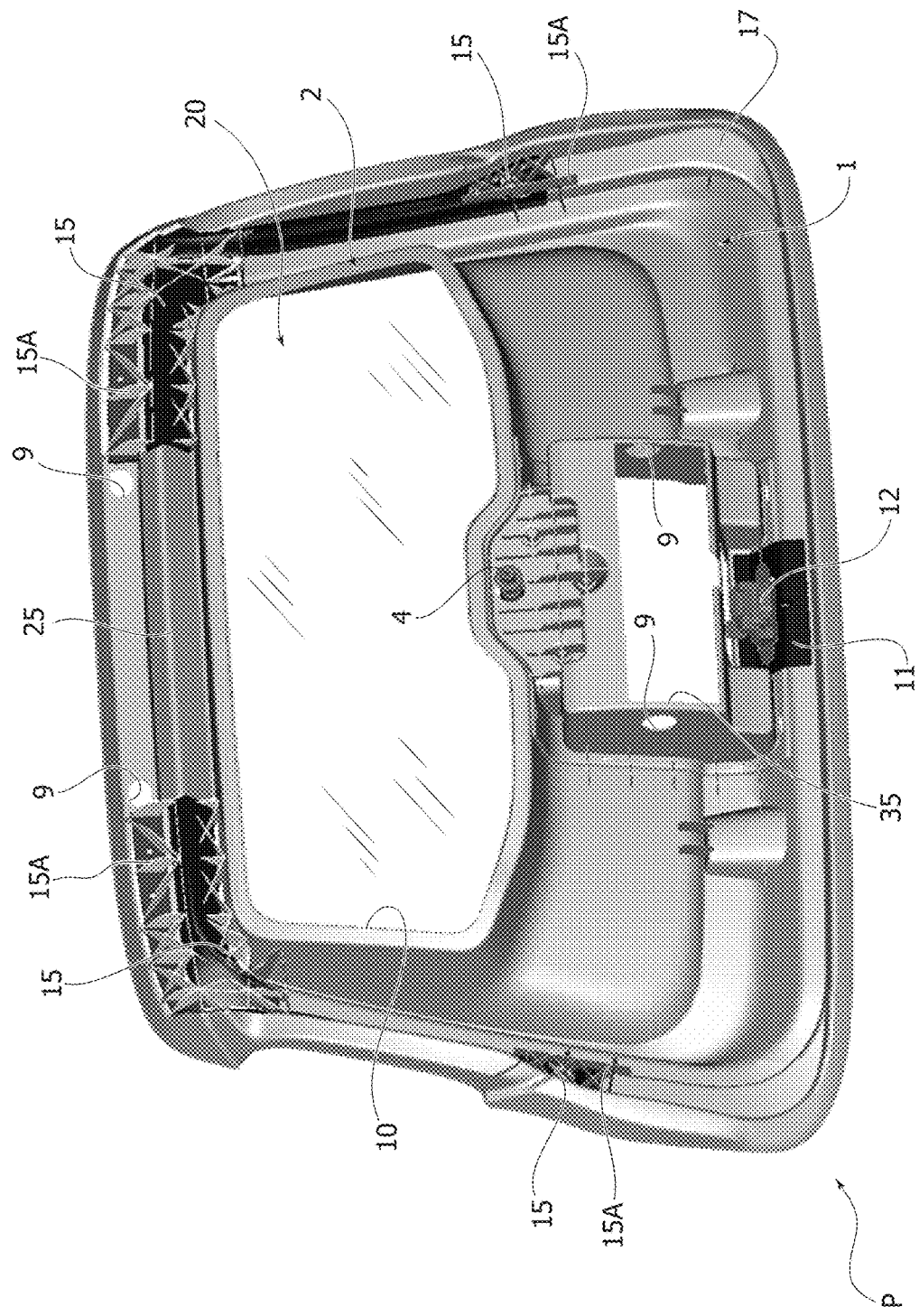
FIG. 5 is a perspective view from inside of the hatchback door of the previous figures, with some components removed.

FIG. 4 is a detailed exploded view of the hatchback door P according to the present invention. From left to right, illustrated in this figure is the removable hatch 7, which is mounted on the inner side of the load-bearing inner panel 1 at the hatch opening 35. The hatch opening 35 is positioned on the load-bearing inner panel 1 in a central portion thereof that is lower than the rear-window opening 10 (FIG. 5). Designated by the reference number 15 are two metal inserts that are integrated in the load-bearing inner panel 1 and are each prearranged for installation of a respective hinge. The hatchback door P further comprises a lock 12 designed to be mounted on a metal insert 11, which is also integrated in the load-bearing inner panel 1 made of composite plastic material.

According to the present embodiment described herein, the hatchback door P has a spoiler 5 glued on the top portion of the load-bearing inner panel 1 and of the top outer panel 2. The spoiler 5 improves the aerodynamic characteristics of the hatchback door P and improves styling thereof. The details regarding gluing of this item will be illustrated in the sequel of the present description.

In an alternative embodiment (not illustrated in the drawings), the spoiler 5 and the top outer panel 2 are made of a single piece.

In order to improve further the aerodynamic performance of the hatchback door P, in lateral end portions of the bottom outer panel 3 and/or of the top outer panel 2 aerodynamic appendages are provided.

Once again in FIG. 4, designated as a whole by the reference C is the layer of glue that is applied between the various parts of the hatchback door P so as to obtain the final assembled conformation of the hatchback door P illustrated in FIGS. 2 and 3. In this connection, according to an important characteristic of the invention, the hatchback door P thus obtained does not present elements of discontinuity that might require numerous sealing elements, such as gaskets, weatherproofing, or the like. In fact, the only gaskets provided in the hatchback door according to the present invention are around the hole for passage of the pin of the rear windscreen wiper 4 and around the lateral sets of lights.

Figure 7:
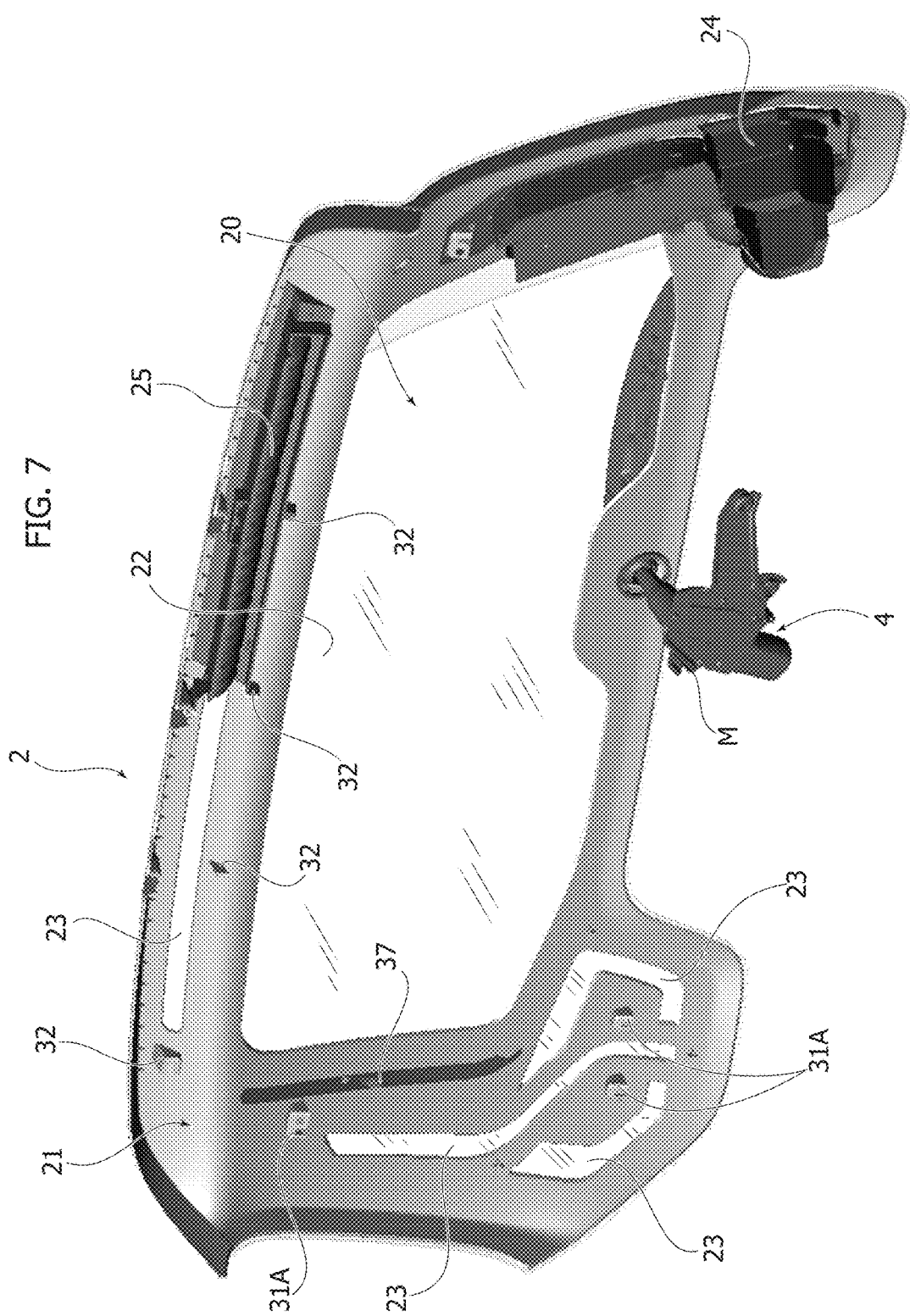

Designated by the references 24, 25 are one of the two lateral sets of lights and the top set of lights, respectively. The lateral sets of lights 24 and the top set of lights 25 each have a body that carries at least one light source and are without a front outer transparent element having the function of lens. In fact, according to an important characteristic of the present invention, the body of each set of lights 24, 25 is connected to a rear side of the top outer panel 2 in such a way that the transparent peripheral portions 23 of the top outer panel 2, defined by the transparent layer 20 alone, constitute the front transparent elements of the sets of lights 24, 25 (FIG. 7). Thanks to this characteristic, the hatchback door P according to the present invention does not envisage the use of conventional elements made of plastic or glass that perform the function of lens for the sets of lights.

In the present description and in the annexed drawings, the constructional details regarding the sets of lights 24, 25 are not presented, since these details may be provided in any known way and also in so far as elimination of these details from the drawings renders the latter more readily and easily understandable.

With reference once again to FIG. 4, a rear windscreen-wiper assembly 4 is designed to be mounted on the hatchback door P within a hole 19 made in the internal load-bearing structure 1, a hole 31 made in the bottom outer panel 3, and a hole 29 made in the top outer panel 2. In fact, as has been seen previously, and as will be further discussed in what follows, once the load-bearing inner panel 1, the top outer panel 2, and the bottom outer panel 3 are glued together, the holes 19, 31, 29 are aligned to one another, thus enabling installation of the rear windscreen-wiper assembly 4 through them.

Designated by the reference number 8 is a pushbutton opening device designed to be mounted on the bottom portion of the bottom outer panel 3. The opening device 8 has the function of releasing the lock 12 of the hatchback door P. The opening device 8 may be made in any known way.

As has been said previously, the bottom outer panel 3 is made of plastic material, and, according to alternative embodiments of the present invention, it may be made of transparent, partially transparent, or non-transparent plastic material. In the case where the bottom outer panel 3 is made of a transparent or partially transparent plastic material, it is possible to install behind it a light source 6 (FIG. 4) designed to light up a portion of bottom outer panel 3. This arrangement may be adopted in view of illumination of a portion of the bottom outer panel 3 so as to display a logo or the like. In this way, the style of the hatchback door P and hence of the motor vehicle for which the hatchback door P is configured is further characterized.

Once again according to an alternative embodiment, the bottom outer panel 3 may be produced with the same technique as the top outer panel 2, i.e., with an outer layer of opaque plastic material or of opaque paint and a partial inner layer of transparent plastic material.

Moreover, in one embodiment (not illustrated in the drawings), the bottom outer panel 3 may include supports prearranged for fixing thereon a number-plate of the motor vehicle.

The choice of providing the bottom outer panel 3 by means of one of the technical solutions described above is made according to the style of the motor vehicle for which the hatchback door P according to the present invention is made.

FIG. 5 is a perspective view of the hatchback door P without some of its elements so as to render visible some constructional details of the hatchback door itself. In particular, illustrated in FIG. 5 is the hatchback door P with the hatch 7 removed. As has been said previously, removal of the hatch 7 enables access through the opening 35 to the rear windscreen-wiper assembly 4, to the lock 12, to the logo lit up and possibly to the sets of lights (for example, for replacement or maintenance or installation of these elements). In the embodiment described herein, the hatch opening 35 is located at the centre underneath the rear-window opening 10.

The hatchback door P moreover has two pairs of holes 9 provided for passage of cables and of the tubes for washing the rear window, where each pair is positioned respectively in the proximity of the third top set of lights 25 and alongside the hatch opening 35.

In a particular embodiment of the invention, all the wiring of the hatchback door P is embedded in the internal load-bearing structure 1. As has been said previously, the internal load-bearing structure 1 made of composite plastic material has, integrated inside it, a plurality of metal inserts. FIG. 5 illustrates the two metal inserts 15 for connection with two hinges (not illustrated herein). The two metal inserts 15 are positioned alongside the spoiler 25. Moreover present along the perimeter of the hatchback door P are two further metal inserts 15 prearranged for enhancing the characteristics of stiffness and containing any thermal expansion. The hatchback door P moreover has a plurality of ribbings made of plastic material designated by the reference 15A, which are provided on peripheral portions of the hatchback door P.

Figure 6:
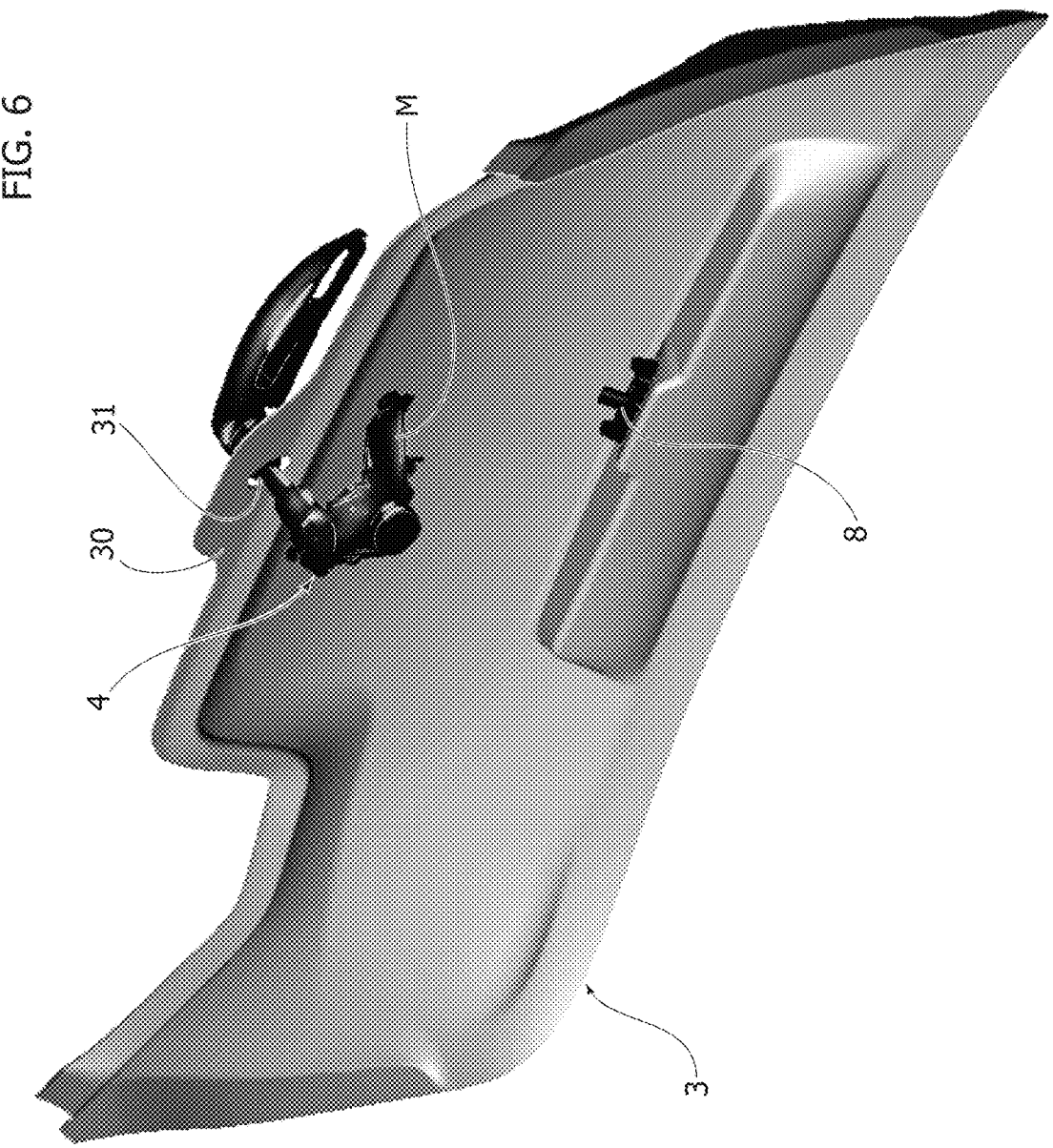
FIGS. 6, 7 illustrate two perspective views of two respective components of the hatchback door of the previous figures.

FIG. 6 is a perspective view of the bottom outer panel 3. As has been said previously, mounted on the bottom outer panel 3 is the pushbutton opening device 8 designed to release the lock 12 of the hatchback door P hence enabling opening of the hatchback door P itself. In the embodiment illustrated herein, the bottom outer panel 3 is made of opaque plastic material, but, as has been said previously, it can be also made with other types of plastic material.

FIG. 7 is a rear perspective view of the top outer panel 2 without some of its details, so as to highlight its important characteristics. This figure highlights the structure already described above of the top outer panel 2, comprising the outer layer of transparent plastic material 20, which covers the entire extension of the panel 2, and the inner layer of opaque plastic material 21 that does not cover the central part 22, which is designed to overly the rear-window opening 10 of the panel 1, so as to leave it transparent. FIG. 7 also illustrates clearly the peripheral portions 23 of the transparent layer 20 that not are covered by the opaque layer 21. These peripheral portions 23 serve as transparent elements for the two lateral sets of lights 24 (just one of which is represented in FIG. 7) and for the third top set of lights 25 (just a part of which is represented in FIG. 7).

The lateral sets of lights 24 and the top set of lights 25 each have a load-bearing body with at least one light source and are without front outer transparent elements, precisely in view of the fact that it is the aforesaid peripheral portions 23 of the transparent layer 20 that function as lens. Designated by the reference 31A are a plurality of fixing elements mounted in and/or obtained from the inner surface of the top outer panel 2 prearranged for fixing the lateral sets of lights 24 to the inner surface of the panel 2. Likewise, designated by the reference 32 are other fixing elements prearranged for installation of the top set of lights 25.

In alternative embodiments of the invention, the sets of lights 24, 25 include a coloured light source or may include a white-light source with a coloured filter set on top in front of the white-light source.

Figure 12:
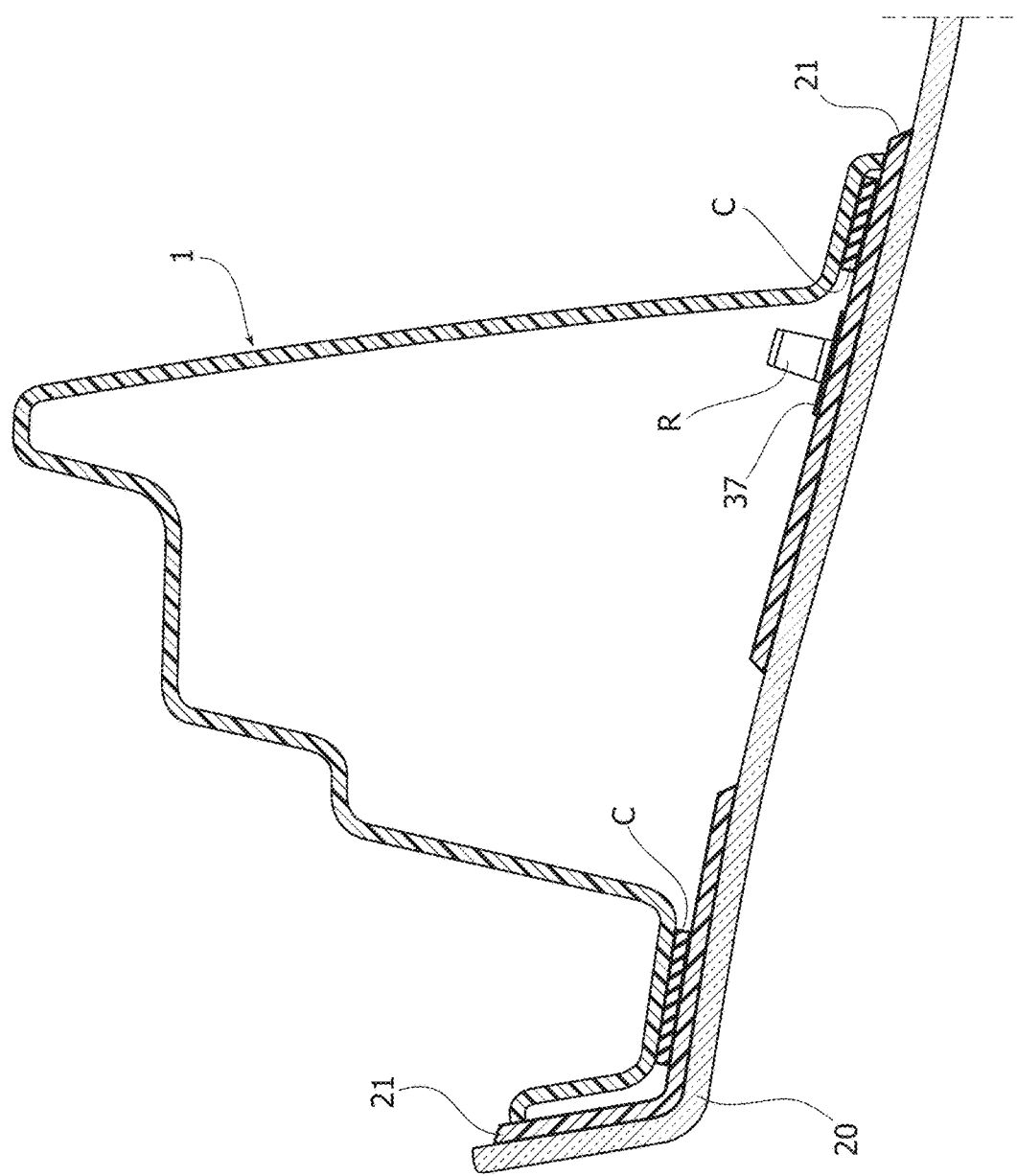
FIGS. 12 and 13 are cross-sectional views of the hatchback door according to the line II-II and the line III-III, respectively, of FIG. 3.

With reference to FIGS. 7 and 12, designated by the reference 37 is a busbar, prearranged for supply of an electrical heating resistance R associated to the panel 22 that functions as rear window. The busbar 37 is totally hidden from view since it is covered on the inside by the inner panel 1 and on the outside is hidden by the opaque material of the outer panel 2 as illustrated in particular in FIG. 12.

The subject of the present invention is also the process for assembling the hatchback door P described above. This process comprises the steps of:

pre-arranging the load-bearing inner panel 1 made of composite plastic material that defines the rear-window opening 10 and having metal inserts for connection with the functional elements of the hatchback door P;

pre-arranging the bottom outer panel 3 made of plastic material, installing the opening command 8;

pre-arranging the top outer panel 2, which comprises the first layer of transparent plastic material 20 and the second layer of opaque plastic material 21;

installing the lock 12, the rear windscreen-wiper assembly 4 on the load-bearing inner panel 1, and the logo, and laying the cables and tubing (the components may be mounted also at a subsequent moment through the opening 7 provided on the load-bearing inner panel 1);

installing the two lateral sets of lights 24 and the top set of lights 25 on the top outer panel 2, the sets of lights 24, 25 each having a supporting body with at least one light source and without a front outer transparent element in such a way that the transparent peripheral portions 23 of the top outer panel 2 constitute the front transparent elements of the sets of lights 24, 25;

gluing the bottom outer panel 3 on the bottom portion of the load-bearing inner panel 1;

gluing the top outer panel 2 on the top portion 30 of the bottom outer panel 3 and on the load-bearing inner panel 1 in such a way that the top portion 30 of the bottom outer panel 3 is set between the top outer panel 2 and the load-bearing inner panel 1;

gluing the spoiler 5; and finally installing the hinges on the load-bearing inner panel 1.

Figure 8:
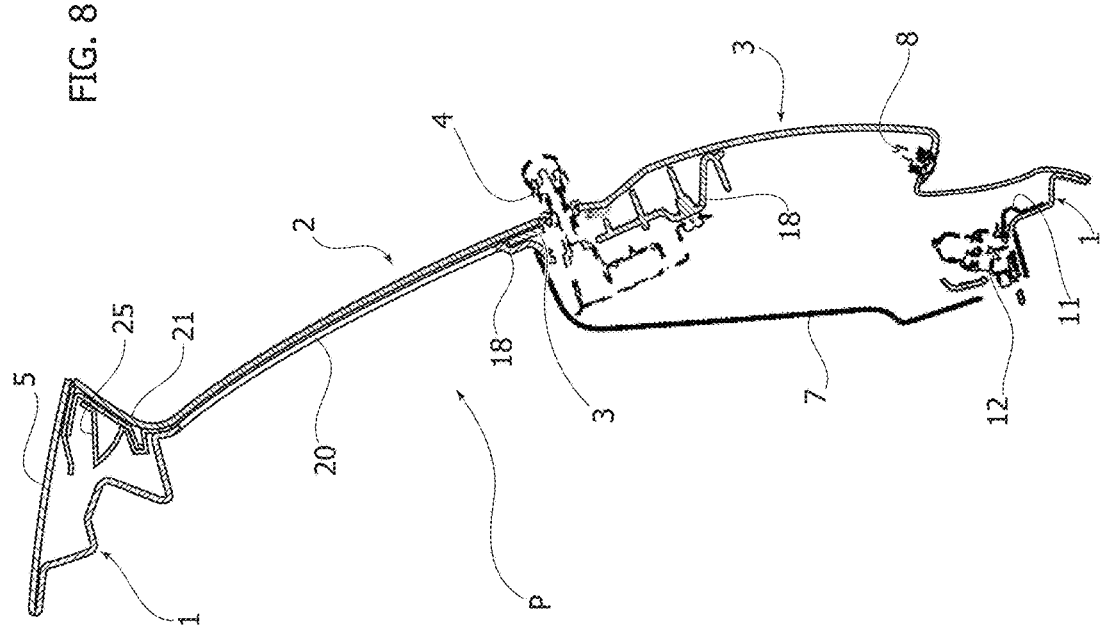
FIG. 8 illustrates a cross-sectional view of the hatchback door according to the line I-I of FIG. 3.

The structure of the hatchback door thus obtained is further visible in the cross sections of FIGS. 8, 9, and 11. According to an important characteristic of the invention, the inner panel 1 made of composite plastic material incorporates in a single piece an internal frame 18 prearranged for fixing the rear windscreen-wiper assembly 4 to the load-bearing inner panel 1. As visible in greater detail in the view at an enlarged scale of FIG. 9, the frame 18 made of plastic envisages a bottom portion prearranged for receiving within it a member 33 for fixing the rear windscreen-wiper assembly 4. According to the prior art, the rear windscreen-wiper assembly 4 comprises an electric motor M pre-arranged for governing the movement of the rear windscreen wiper. The inner structure 18 and the electric motor M are hidden from view by the removable hatch 7 of the load-bearing inner panel 1. The details regarding the rear windscreen-wiper assembly are not discussed herein since they may be obtained in any way in itself known.

Moreover, once again with reference to FIG. 9, following upon the process illustrated previously, the portion of hatchback door P above the rear windscreen-wiper assembly 4 is made up as described in what follows. Starting from the inner side of the hatchback door, in order there are present the load-bearing inner panel 1, a layer of glue C designed to glue the load-bearing inner panel 1 to the top portion of bottom outer panel 3, the bottom outer panel 3, a second layer of glue C designed to glue together the top portion of the bottom outer panel 3 and the layer of opaque plastic material 21 of the top outer panel 2, the layer of opaque plastic material 21, and finally the layer of transparent plastic material 20 of the top outer panel 2. The bottom outer panel made of plastic material 3 is then glued on the bottom portion of the load-bearing inner panel 1 and has a top portion glued also to a bottom portion of the top outer panel 2. Consequently, the top portion 30 of the bottom outer panel 3 is set between the top panel 2 and the load-bearing inner panel 1. Also thanks to this characteristic, the hatchback door P presents adequate characteristics of strength, typical of a hatchback door made of sheet metal, even though it is produced with components made of plastic material glued together, without resorting to the use of parts made of sheet metal.

Figure 13:
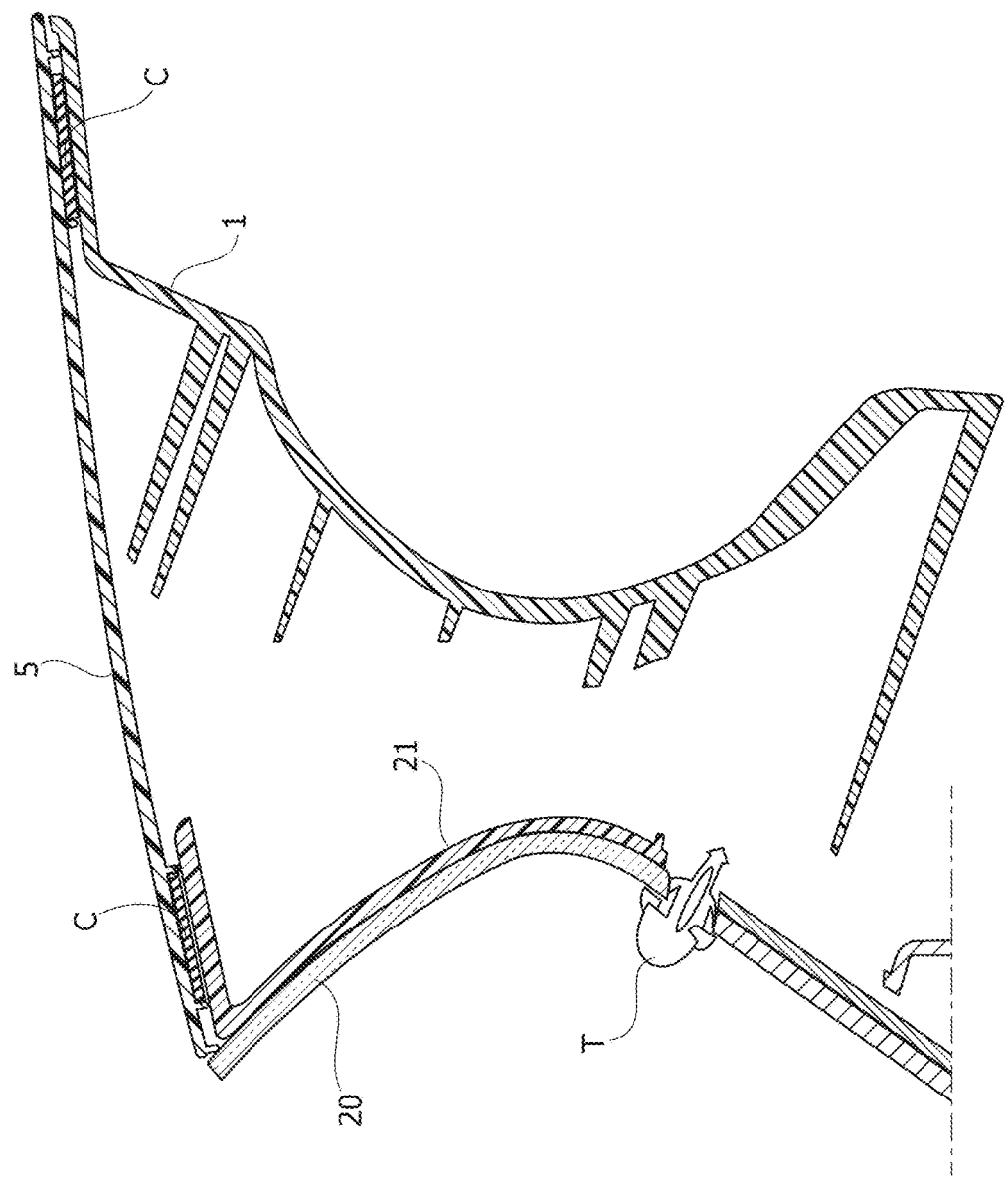

With reference to FIG. 10, the top outer panel 2 has a hole 29 configured for being aligned to the hole 19 of the internal load-bearing structure 1 and to the hole 31 of the bottom outer panel 3. According to an important characteristic of the present invention illustrated in FIG. 10, the top outer panel 2 has the hole 29 provided for housing a rubber seal ring 36 (illustrated in FIG. 9) of the rear windscreen-wiper assembly 4. Around the hole 29, the inner surface of the top outer panel 2 has a projecting annular edge 40, which surrounds the aforesaid hole 29. During a step of painting of the inner surface, the projecting annular edge 40 prevents the paint from possibly dripping through the hole 29 and reaching the outer surface of the top outer panel 2, giving rise to surface defects. Moreover, with reference to FIG. 13, the top outer panel 2 also has a hole pre-arranged for passage of a nozzle for a rear-window sprayer T. FIG. 11 illustrates at an enlarged scale the top portion of the sectioned view of FIG. 8 of the hatchback door P and shows further constructional details of the hatchback door P. The spoiler 5 is glued with two layers of glue C, a connecting a first spoiler portion 51 to the load-bearing inner panel 1 and the other connecting a second spoiler portion 52 to the layer of opaque plastic material 21 of the top outer panel 2.

The third top set of lights 25 is mounted throughout its extension on two distinct portions made of opaque plastic material 21 of the top outer panel 2 by means of the fixing elements 32 illustrated previously.

Moreover, with a view to bestowing greater stiffness on the hatchback door P, a further layer of glue C is set between a portion of opaque plastic material 21 and a portion of load-bearing inner panel 1. This layer of glue is interposed in the portion of hatchback door immediately above the rear-window opening 10 of the load-bearing panel 1.

As is evident from the foregoing description, the motor-vehicle hatchback door P according to the present invention combines low weight and adequate characteristics of strength, torsional stiffness, and contained thermal expansion.

Thanks to the fact that the hatchback door P is obtained by gluing elements shaped and prearranged in the way described above, it is possible to adopt a process of assembly that is economically advantageous and obtain complex shapes of hatchback door that would otherwise be difficult or not economically advantageous to produce.

Of course, without prejudice to the principle of the invention, the details of construction and the embodiments may vary widely with respect to what has been described and illustrated herein purely by way of example, without thereby departing from the scope of the present invention.

What is claimed is:

1. A hatchback door for motor vehicles comprising:
   a load-bearing inner panel made of composite plastic material, which defines a rear-window opening and has a plurality of metal inserts for connection of functional elements,
   a top outer panel made of plastic material designed to be glued on a top portion of said load-bearing inner panel, wherein said top outer panel comprises a first layer of transparent plastic material and a second layer of opaque plastic material or of opaque paint, wherein said second layer of opaque plastic material or of opaque paint covers only some parts of said transparent layer in such a way that said top outer panel is transparent in a central part thereof overlying said rear-window opening of said load-bearing inner panel, and
   a bottom outer panel made of plastic material glued on a bottom portion of said load-bearing inner panel and having a top portion that is also glued to a bottom portion of said top outer panel in such a way that the top portion of said bottom outer panel is set between said top outer panel and said load-bearing inner panel,
   wherein:
   said top outer panel is transparent also in its peripheral portions that are to function as front transparent outer elements for two lateral sets of lights and for a third top set of lights,
   said two lateral sets of lights and said third top set of lights each having a load-bearing body with at least one light source and without a front transparent outer element, the body of each set of lights being connected to a rear side of said top outer panel by a plurality of fixing elements mounted in and/or obtained from an inner surface of the top outer panel, in such a way that said transparent peripheral portions of the top outer panel constitute the front transparent outer elements of said sets of lights.

2. The hatchback door according to claim 1, wherein said top outer panel has a hole for housing a rubber seal ring of a rear windscreen-wiper assembly, wherein an inner surface of said top outer panel has a projecting annular edge, which surrounds the hole and is designed to prevent, during painting of said inner surface, paint from dripping through the hole and reaching the outer surface of the top outer panel, said top outer panel having another hole provided for passage of a nozzle for a rear-window sprayer.

3. The hatchback door according to claim 1, wherein a spoiler is glued on said load-bearing inner panel and on said top outer panel.

4. The hatchback door according to claim 1, wherein said bottom outer panel is made of transparent or partially transparent plastic material.

5. The hatchback door according to claim 4, wherein fixed on said load-bearing inner panel is a light source for lighting up a portion of the bottom outer panel, for display of a logo or the like.

6. The hatchback door according to claim 1, wherein said bottom outer panel is made of a non-transparent and/or painted plastic material.

7. The hatchback door according to claim 1, wherein said bottom outer panel comprises another first layer of transparent plastic material and another second layer of opaque plastic material or of opaque paint, wherein said another second layer of opaque plastic material or of opaque paint covers only some parts of said another first layer of transparent plastic material.

8. The hatchback door according to claim 1, wherein each of the sets of lights includes at least one coloured light source.

9. The hatchback door according to claim 1, wherein each of the sets of lights includes a white-light source and a coloured filter set in front of said white-light source.

10. The hatchback door according to claim 1, further comprising a busbar prearranged for supply of an electrical heating resistance associated to a central part of the top outer panel functioning as rear window, wherein said busbar is covered on its inside by the load-bearing inner panel and is covered on its outside by the second layer of opaque plastic material of the top outer panel.

11. The hatchback door according to claim 1, wherein wiring of said hatchback door is embedded in internal load-bearing structure of the load-bearing inner panel.

12. The hatchback door according to claim 3, wherein said spoiler and said top outer panel are made of a single piece.

13. The hatchback door according to claim 1, wherein in lateral end portions of said hatchback door, aerodynamic appendages are provided designed to improve aerodynamics of said hatchback door.

14. A process for assembling a hatchback door according to claim 1, wherein said process comprises the steps of:
   pre-arranging said load-bearing inner panel made of composite plastic material;
   pre-arranging said bottom outer panel made of plastic material, installing an opening device;
   pre-arranging said top outer panel made of plastic material;
   installing a lock and a logo that is lit up and a rear windscreen-wiper assembly on said load-bearing inner panel, and laying associated cables and tubing;

installing the lateral sets of lights and the top set of lights on the top outer panel, said sets of lights each having a load-bearing body with at least one light source and without a front transparent outer element in such a way that the transparent peripheral portions of the top outer panel constitute the front transparent outer elements of said sets of lights;

gluing said bottom outer panel on a bottom portion of said load-bearing inner panel; and gluing said top outer panel on a top portion of said bottom outer panel and on said load-bearing inner panel in such a way that the top portion of said bottom outer panel is set between the top outer panel and said load-bearing inner panel.

* * * * *